US005247152A

United States Patent [19]

Blankenship

[11] Patent Number: 5,247,152

[45] Date of Patent: Sep. 21, 1993

[54] PLASMA TORCH WITH IMPROVED COOLING

[76] Inventor: George D. Blankenship, 12221 Bradford Rd., Chardon, Ohio 44024

[21] Appl. No.: 659,905

[22] Filed: Feb. 25, 1991

[51] Int. Cl.[5] ............ B23K 9/00

[52] U.S. Cl. ............ 219/121.49; 219/121.48; 219/121.59; 219/75

[58] Field of Search ............ 219/121.48, 121.49, 219/121.51, 121.5, 74, 75, 121.59; 313/231.21, 231.31

[56] References Cited

U.S. PATENT DOCUMENTS 2,906,857 9/1959 Nestor ............ 219/121
3,450,926 6/1969 Kierman ............ 313/231
3,597,649 8/1971 Bykhovsky et al. ............ 313/211
3,731,047 5/1973 Mullen et al. ............ 219/121.52
4,024,373 5/1977 Bykhovsky et al. ............ 219/121
4,125,754 11/1978 Wasserman et al. ............ 219/121.49
4,477,711 10/1984 Mihara et al. ............ 219/121.49
4,505,945 3/1985 Dubust et al. ............ 219/121.49
4,558,201 12/1985 Hatch ............ 219/121

*Primary Examiner*—Mark H. Paschall

[57] ABSTRACT

A plasma torch and the method of cooling the torch wherein specified heated surfaces and in particular the heated tip portion of an electrode within the torch have a low volume of liquid coolant directed thereagainst. The volume of the liquid coolant is controlled so that the liquid coolant evaporates into vapor as it contacts the specified heated surfaces.

42 Claims, 6 Drawing Sheets

PLASMA TORCH WITH IMPROVED COOLING

The present invention relates to an arrangement for cooling the electrode of a plasma torch. The invention is applicable for cooling the components of the plasma torch and in particular the electrode located in the plasma torch by converting a liquid coolant supplied to an axial, closed ended cooling passage to vapor and will be described with reference thereto; however, the invention has much broader applications and may be used to cool other components of a plasma torch.

BACKGROUND OF THE INVENTION

Plasma torches are commonly used for cutting, welding and spray bonding of workpieces and are operated by directing a plasma consisting of ionized gas particles toward a workpiece. In the operation of a typical plasma torch, a gas to be ionized is supplied to the front end of the plasma torch and channeled between a pair of electrodes before exiting through an orifice in the torch nozzle. One electrode, which is at a relatively negative potential, is usually referred to as the "cathode" or simply as the "electrode". The torch nozzle, which is adjacent to the end of the "electrode" at the front end of the torch or the workpiece, constitutes the relatively positive potential electrode or "anode".

When a sufficiently high voltage is applied, an arc is caused to jump the gap between the electrode and the torch nozzle, thereby heating gas passing around the electrode and between the electrode and nozzle and causing it to ionize. A high frequency voltage between the electrode and the nozzle starts the plasma arc. The ionized gas flows out of the torch and appears as an arc that extends externally from the outlet in the torch nozzle. This is the pilot arc. When this pilot arc is brought near the workpiece, the arc transfers to the workpiece which then serves as the anode. This operation is initiated by the torch head being moved close to the workpiece so the arc jumps or transfers between the electrode and the workpiece.

During the operation of a conventional plasma torch, the torch becomes very hot, especially near the plasma outlet. Therefore, sufficient cooling of the torch is provided during normal operation to prevent structural elements of the torch, such as the electrode and/or the nozzle, from either melting or deteriorating too rapidly.

Examples of cooling plasma arc torches by the use of gas are disclosed in U.S. Pat. Nos. 4,024,373 and 4,558,201. Cooling with gas alone can be adequate to prevent melting or extremely rapid deterioration of the torch structural components. Further, with gas cooling of the torch components, the torch can be portable since it does not require the bulky liquid coolant reservoirs, radiators or heat exchangers and/or complicated piping associated with the use of a recirculating liquid coolant. Still, for safety and economic reasons, improvements in cooling which exceed that provided by gas alone for reducing the speed of deterioration of the torch components and the lowering of the torch operational temperature is always an important factor in plasma arc torch design. Consequently, plasma arc torches have also been cooled with liquid coolants by conventional recirculating systems disclosed in U.S. Pat. Nos. 2,906,857; 3,450,926 and 3,597,649. Cooling with a liquid coolant provides adequate cooling to prevent the torch from overheating and from deteriorating too rapidly. However, water cooling usually requires relatively complicated flush supply and conduit recirculation systems which are more expensive to manufacture than gas cooling systems and often require repair due to the high operating temperatures of the torches and the rough handling during normal usage. Besides the extra expense caused by equipment failure and the resulting down time and lost production costs often associated with water cooled torches, the requirement for a relatively large, bulky coolant supply tank and a relatively fragile heat exchanger prevents torches with this type of cooling from being easily portable.

SUMMARY OF THE INVENTION

The present invention is specifically directed to a system for cooling an electrode disposed in a gas flowing chamber having an inlet and outlet at opposite ends of a plasma torch whereby a controlled amount of liquid coolant, typically water, is directed into an axial chamber of the electrode at a sufficiently low rate for conversion into vapor within the chamber to cool the heated tip portion of the electrode. The liquid is preferably directed into the high temperature, tip end of the electrode for this cooling purpose.

In accordance with one aspect of the invention, the axial cooling chamber extends into the electrode from one end thereof and is closed at the other end. The vapor generated by evaporation of the liquid coolant is combined with a gas, such as compressed air, supplied to the inlet end of the torch to form an aggregate flow of gas and vapor which cools various torch components including the torch outer housing, a nozzle disposed within the outlet end of a chamber defined by the torch housing and the electrode within the nozzle.

In the preferred embodiment, the invention includes a small diameter coolant tube having an inlet and outlet at opposite ends disposed in the axial cooling chamber of the electrode. The inlet end is connected to a liquid coolant supply and the outlet end is disposed adjacent the closed end of the axial cooling passage. A pump supplies a controlled amount of liquid coolant from the supply to the coolant tube inlet so that liquid water in the closed end of the electrode is preferably completely boiled away and converted to vapor during the operation of the torch. However, the water need not be completely boiled away provided the water in liquid form is well atomized as it leaves the torch. In this way, large droplets of water do not block the small gas orifices of the torch. The volume of liquid collected in the bottom of the electrode at any one time is purposely kept small to prevent flooding of the torch and the mixing of coolant in the liquid phase with the primary plasma flow. Accordingly, the supply pump preferably delivers liquid coolant so that the coolant tube dispenses a single discrete drop of the liquid coolant at a time into the heated lower, tip end of the electrode chamber. Conversion of the water or other coolant from the liquid state to the vapor state consumes significantly more heat energy than the heat energy required to only heat the water below boiling as in a recirculating liquid cooling system. This is due to the latent heat of vaporization being much higher than the heat needed to raise the temperature of the water or coolant to boiling. Accordingly, the complete conversion of the small volume of liquid water to vapor causes a significant transfer of heat from the electrode for effective cooling thereof. In the prior art, water flowed into the coolant chamber and was heated at a rate determined by the ratio of absolute temperature of the water and the tip end of the electrode. As an alternative cooling concept, the elongated cooling passage with the controlled liquid injected against hot surfaces can be located in the nozzle adjacent the tip portion of the electrode. The vapor can then be combined with cooling gas and circulated around the electrode in the same manner as when the coolant passage is in the electrode itself. These arrangements are improvements over the prior liquid cooling concepts. The water flowing through the cooling chamber of the prior art was generally directed through separate water chambers which adds significant complexity to the system as compared with introducing water or vapor directly into the gas chambers of the torch in accordance with the present invention. Moreover, the flow rate and volume of the prior art cooling system was high enough to maintain the chamber full of water. Thus, a limited amount of heat was extracted. To remove more heat the water flow rate was increased. More heat per water volume can be removed by dispensing small amounts of water into the passage so that the heated surfaces of the cooling passage causes flash evaporation of the coolant.

In accordance with an aspect of the invention, the cooling liquid is water or an aqueous solution.

In accordance with another aspect of the invention, the amount of liquid coolant supply for flash evaporation is controlled in accordance with the temperature of the electrode. A flow regulator is connected to both the electrical power supply and the pump water supply. Then the pump is regulated to deliver coolant liquid to the coolant tube in proportion to the electrical power being delivered to the torch. The rate is about 100 ml/hr of water for each 8-15 amperes of current directed to the electrode. However, depending on the specific torch design, the water flow rate and the current rate will be adjusted accordingly.

A significant advantage of the invention is that failure of the liquid coolant system does not cause the torch to malfunction. If the coolant liquid is discontinued, the cooling gas delivered to the torch provides adequate cooling by itself to prevent the excessive, rapid erosion of the consumable electrode or even melting of the torch and/or the various components housed therein. If too much liquid is directed to the electrode cooling chamber, the chamber is flooded and the torch is cooled by the flowing liquid.

In accordance with one embodiment of the invention, a supply of gas, typically compressed air, suitable for generating a plasma gas and a cooling gas is connected to the torch. The gas is supplied to a first flow chamber defined by the inner surface of the axial chamber in the electrode and the outer surface of the coolant tube. The gas also is supplied to a second flow chamber defined by an inner surface of a nozzle at the end of the torch and the outer surface of the electrode. The gas flowing to the first chamber, besides acting as a coolant for the electrode, mixes with the steam or vapor and flows through an orifice in the torch to combine with the gas supplied to the second flow chamber surrounding the electrode which forms the plasma emitted from the torch. Preferably, a third flow chamber defined by an inner surface of the chamber within the plasma torch housing and the outer surface of the nozzle receives gas from the gas supply for cooling the nozzle and the torch outer housing.

In yet another embodiment, the supply gas is separated into a primary flow directed to the chamber between the electrode and the nozzle and a secondary or shield flow between the outer peripheral surface of the nozzle and the inner peripheral surface of the torch outer housing. Prior to the separation, the gas and the liquid coolant are directed to the axial chamber within the electrode. The coolant liquid is converted into vapor, combined with the gas flow and directed into a chamber between the inlet end of the torch and the upper end of the electrode. The resulting aggregate of gas and vaporized coolant is then separated into the primary and secondary shield gas flows. The vapor and gas mixture is thought to be advantageous because i reduces the operating temperature of the electrode, the nozzle, as well as the other torch components, and thereby lengthens their service life.

In another specific embodiment, the gas is initially separated into a coolant gas flow directed into the axial chamber within the electrode, a primary flow directed to the chamber between the electrode and the nozzle and a shield flow between the outer peripheral surface of the nozzle and the torch outer housing. The liquid coolant, converted to the vapor state within the electrode, is combined with the secondary or shield gas flowing between the outer peripheral surface of the nozzle and the inner peripheral surface of the torch outer housing. This is advantageous because liquid, such as from incomplete vaporization of the liquid coolant, does not get mixed into the primary gas flow and possibly clog the passageways and/or otherwise interfere with the generation of plasma gas. Also, impurities, such as salts within the coolant, do not build up in the passageways through which the primary gas flows.

In another embodiment of the invention, the liquid coolant is directed into the axial chamber of the electrode at a rate for conversion into vapor. The vapor is then mixed with the gas prior to its being separated into the primary and secondary gas flows. This embodiment is advantageous because the construction of the torch is simplified, as compared with the previously described embodiments since no air is delivered directly to the axial chamber of the electrode. Further, any impurities, i.e. salts, within the vapor are likely to be collected in the axial chamber of the electrode since no high pressure gas is forcing the vapor out of the chamber. The electrode is periodically replaced and the impurities are then removed from the torch.

In another specific embodiment, the liquid coolant is directed into the axial chamber of the electrode at a rate for conversion into vapor. The vapor is then mixed only with the secondary gas flow near the outlet of the torch.

In a related invention, the liquid coolant delivered to the cooling chamber can be atomized in the torch. Then, some of the atomized water boils through contact with the peripheral inner surface of the cooling chamber in the electrode while the remainder of the atomized water, now heated, flows through the torch. It should be noted that while the use of atomized water can provide very effective cooling, salts present in the water will be carried through the torch with the atomized water and possibly build up on the peripheral surface of the passageways and ultimately decrease the cooling efficiency of the system or even cause it to malfunction. Where the liquid is completely vaporized in accordance with the preferred embodiment of the invention, the salts accumulate in the electrode which is ultimately discarded.

The provision of the additional cooling afforded by the boiling of controlled amounts of water into vapor within the electrode is extremely beneficial to the performance of a plasma torch and has significant advantages over the prior art gas cooling and/or recirculating liquid cooling systems. In general, plasma torches constructed using the principles of the invention have a much longer service life, thus minimizing down time and lost production costs that are associated with existing plasma torches. More specifically, the present invention is of a less complicated design, i.e. uses fewer parts, as compared with water recirculating systems and is therefore inherently more reliable. Further, only a small amount of water is used because more heat is required to vaporize water into steam as compared to heating water as in the prior art recirculation systems. Therefore the water supply reservoir can be small and easily adaptable to portable plasma torch systems. There is no need to connect the torch to a water supply even though the advantages of water cooling are obtained. With a small supply reservoir, the water can be treated to prevent impurities from collecting in the torch. Moreover, any impurities which exist and separate from the vapor will primarily collect within the cooling chamber formed in the electrode and therefore will not interfere with or clog the gas passageways.

A still further feature of the invention is that the steam remains in the vapor state throughout the flow through the torch, due to the high operating temperature of the torch and thus does not adversely affect the gas plasma or cooling gas within the torch. The liquid vapor, when water is used as the liquid coolant, appears to increase the efficiency of the plasma. A possible further benefit of the vapor is the preheating of the primary gas flow from mixing with the vapor and the resultant increase in efficiency with which the gas is formed into plasma. Given the drastic temperature drop of the electrode operated in accordance with the present invention and the fact that saturated steam has a higher specific heat than air, the overall plasma torch temperature falls. Operating the torch at the lower temperature allows for the use of many plastic materials in its construction that would otherwise readily melt without the water injection.

The primary object of the present invention is to provide a plasma torch wherein a liquid coolant supplied to a heated surface of the electrode of a plasma torch is converted into a vapor. This vapor may be mixed with the primary flow of gas forming the plasma and/or the cooling gas flowing around the nozzle of the plasma torch.

Another object of the present invention is to provide a plasma torch which only requires a small liquid coolant supply and can therefore be portable while providing the necessary cooling rate for vapor cooled, plasma torch systems.

An object of the present invention is to provide a plasma torch wherein atomized liquid coolant is introduced into a plasma torch for cooling the torch by mixing with the plasma forming gas and then converting the coolant to vapor through contact with the hot surfaces of the electrode in the torch.

A further object of the present invention is to provide a plasma torch system wherein vapor coolant is mixed into the secondary or shield gas flowing past the outer peripheral surface of the nozzle to enhance torch cooling and the efficiency of the plasma.

A still further object of the present invention is to provide a plasma torch wherein the circulation of the coolant in the vapor state substantially reduces the accumulation of impurities in the passageways through the torch.

A yet further object of the present invention is to provide a plasma torch wherein impurities are collected in the electrode.

A still further object of the present invention is to provide a plasma torch which is effectively cooled to thereby increase its service life and reduce operation costs associated with plasma torch systems.

A yet further object of the present invention is to provide a plasma torch which is advantageous in that the gas for cooling the torch provides preheated gas for efficiently forming plasma gas.

Another object of the present invention is to provide a plasma torch which can still operate if the liquid coolant system malfunctions either by providing no liquid or by providing an excess of liquid.

These and other objects and advantages will become apparent from the following description, taken together with the accompanying drawings

PREFERRED EMBODIMENT

Figure 1:
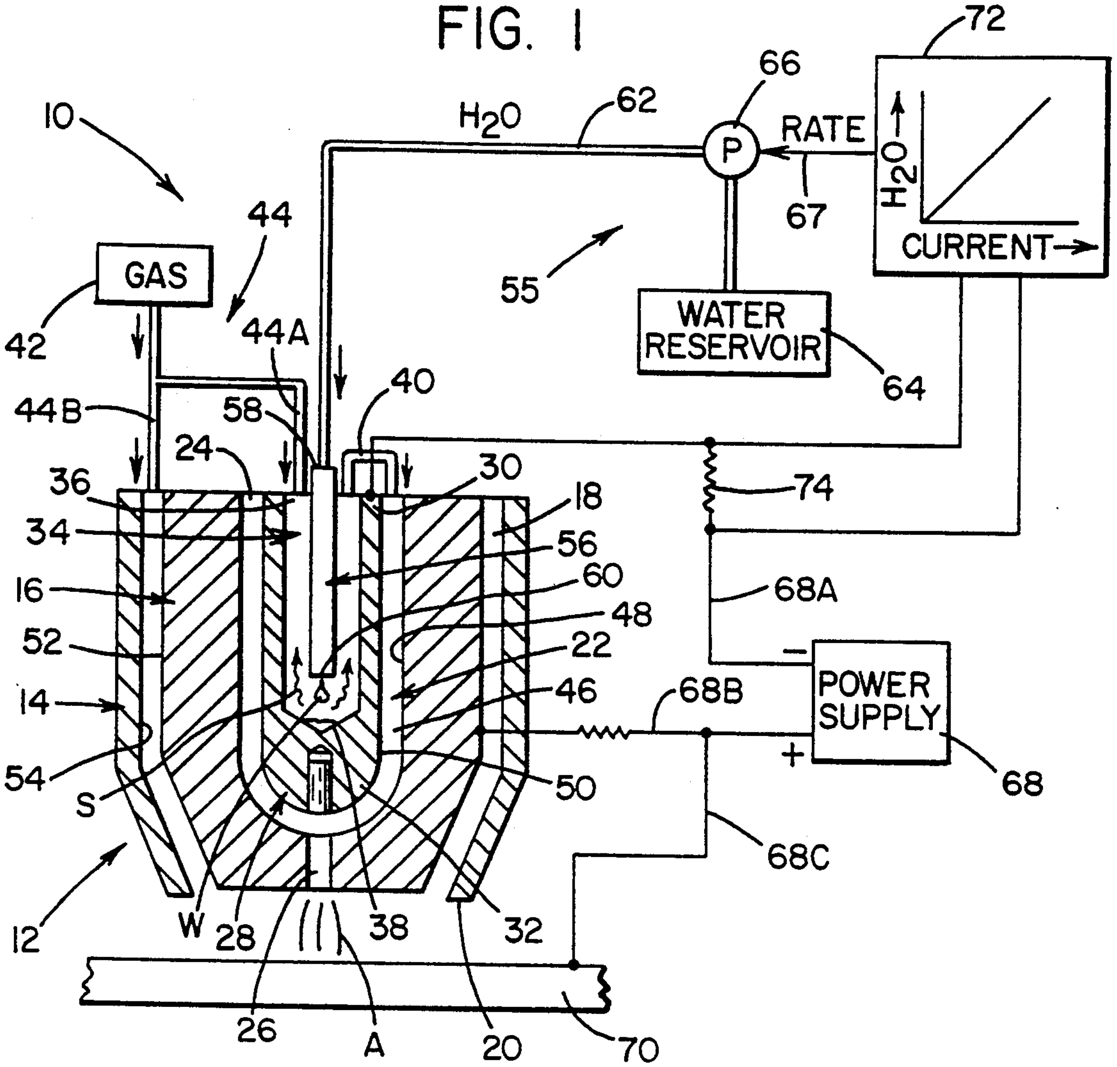
FIG. 1 is a schematic of a plasma torch system constructed in accordance with the invention with the plasma arc torch in cross-section.
Figure 2:
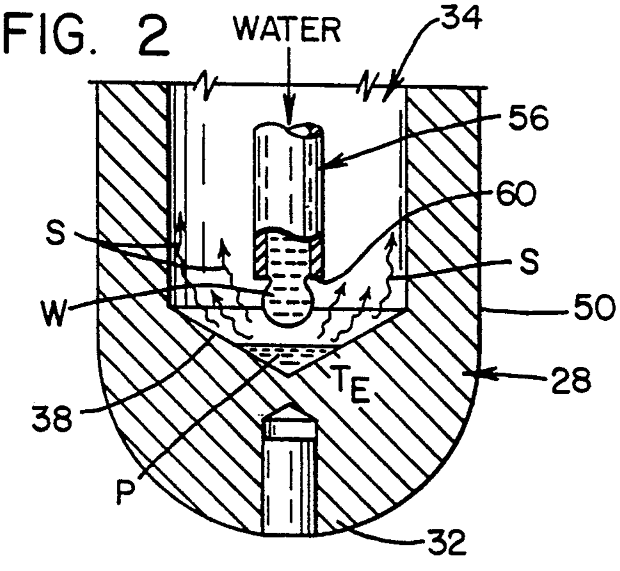
FIG. 2 is enlarged cross-sectional view through the end of an electrode illustrating the controlled delivery of coolant liquid to the bottom end of a cavity or coolant passage in an electrode as shown in FIG. 1.

Referring now to the drawings, wherein the showings are for the purpose of illustrating the preferred embodiment of the invention only and not for the purpose of limiting said invention, FIGS. 1 and 2 show a schematic of a plasma torch system 10. The outlet end of a plasma torch 12, illustrated in section, includes a torch housing 14. A nozzle 16 is disposed within a chamber 18 near the outlet end 20 of the housing 14. The nozzle has a hollow core or chamber 22 with an inlet opening 24 at one end and an exit orifice 26 at the other end. An elongated electrode 28 having first and second opposite ends 30 and 32, respectively, is disposed within the hollow core or chamber 22 near the outlet orifice and includes an axial chamber or cooling passage 34 extending into the electrode from an open end 36 to a closed bottom or tip end 38. An orifice means 40 schematically illustrated as a conduit provides flow communication between chamber or passage 34 in the electrode and the core or chamber 22 of the nozzle. A gas supply reservoir or supply 42, such as a supply of compressed air, provides gas which is generally suitable for generating a plasma gas and a cooling gas. For certain applications, as discussed hereinafter, two or more gases can be used for different functions, i.e. plasma and cooling. The gas is supplied by conventional flow lines schematically illustrated as a conduit network 44 having lines 44A and 44B communicating, respectively, with the chamber 34 within the electrode and chamber 18 between the outer peripheral surface 52 of the nozzle and the inner peripheral surface 54 of the torch housing 14. In FIG. 1, a single gas supply 42 provides the cooling and plasma gas for torch 12. The gas in supply 42 could also be directed by a conduit to passage or chamber 46.

The present invention is particularly directed to a system 55 for directing a controlled amount of fluid coolant to the axial chamber or cooling passage 34 of electrode 28 for conversion into vapor, such as steam, within coolant passage or chamber 34 to advantageously cool the torch components, and in particular the heated tip end of the electrode. The cooling system 55 includes a small diameter coolant tube 56 having an inlet 58 and an outlet 60 at opposite ends being disposed in the axial cooling chamber 34 of the electrode. The outlet 60 of the coolant tube is disposed adjacent to the closed bottom end 38 of the axial cooling chamber in the electrode. This end 38 is adjacent the tip end 32 of the electrode. The inlet end 58 of the coolant tube is connected by a flow tube 62 to a liquid coolant reservoir 64. Typically, the liquid coolant is water or an aqueous mixture. Due to the need for only a relatively small sized reservoir 64, additives can be economically added to condition the water and prevent unwanted buildup of impurities, such as salts, within the torch. The small reservoir provides portable operation since it is not necessary to directly connect to a source of tap water which would require the water source being disposed near the area in which system 10 is operated.

A controlled volume of liquid coolant is supplied to the coolant tube 56 by a pump 66 disposed in the flow line 62 between the liquid coolant reservoir 64 and the coolant tube 56. In order to selectively inject the coolant in carefully controlled volumes or rates, for the reasons discussed hereinafter, the pump 66 is preferably a positive displacement type, such as peristaltic pump, which enables the flow rate to be controlled over a specific range of back pressures to provide a substantially constant flow rate through injection tube 56 at a given setting at input control line 67. Such a pump is especially suitable since it is relatively straight forward in its operation and relatively easy to service.

A conventional DC power supply 68 is connected by lines 68A, 68B, 68C to the electrode, the nozzle and the workpiece 70, respectively. The power supply operates in a conventional manner. In practice, high frequency voltage may be applied between nozzle 16 and electrode 28 to start the plasma arc. That is, it provides selected amounts of power depending on the operating characteristics of the specific torch and the type of operation for which it is being used. To create and sustain a plasma column A between the workpiece and outlet 26, a pump control 72 is connected to the power supply 68 in a conventional manner such as through a current sensing device 74. The pump control provides a signal in response to the current flow between the power supply and the torch. The signal modulates the pump output proportionately to the current whereby the volume of coolant being supplied to the electrode for conversion to vapor is directly proportional to the electric current flow from the power supply. It is possible to manually set the water delivery rate; however, automatic control based upon the amperes used in the plasma operation is used in the illustrated embodiment of system 10.

The operation of the plasma torch system 10 will be explained with reference to FIG. 1 and FIG. 2 which is an enlargement of the cooling passage and injection tube. During normal operation of the torch 12, the power supply 68 is initially connected through a circuit including the electrode and the nozzle and then, once the torch is operating on the workpiece 70, the connection is through a circuit including the electrode and the workpiece. Concurrently, compressed air from supply 42 pressurized to about 4 atmospheres, flows through cooling passage 34 and into chamber 46 in the nozzle by way of orifice means 40 and is ionized by the plasma at end or tip 32. This generates a plasma in the form of an arc between the electrode and/or the workpiece. The plasma A is an arc through the ionized gas and is emitted through the exit outlet or orifice 26 and is directed towards the workpiece 70 to operate thereon for cutting, welding or spray bonding.

The plasma A is typically at a very high temperature, such as between 4000° C. and 25000° C. and the structural components of torch 12 are accordingly at high operating temperatures especially near orifice 26. This is especially true adjacent tip end 32 and outlet 26. Subjecting the torch components to such a high operating temperature at plasma A causes them to rapidly deteriorate, malfunction and/or melt. Further, high operating temperatures prevent the use of many plastics in constructing the torch. Electrode 28 is formed from relatively pure copper because of the superior heat transfer of this material. The gas around the electrode is swirled to develop a boundary layer that insulates the electrode from the arc temperature to protect the electrode; however, the electrode does erode quickly from high temperature exposure. The electrode would melt with insulated exposure to the high temperature arc. Consequently, the electrode and components adjacent the tip or end of the electrode are heated excessively and effective cooling of plasma torches is an essential aspect of torch design.

As illustrated in FIG. 1, the compressed gas supply 42 is connected through a secondary cooling flow path 44B to outer chamber 18 which cools torch housing 14 and nozzle 16. The gas supply is further connected through conduit 44A to chamber 46 by way of chamber 34 to direct the flow of plasma generating gas through chamber 46 between the nozzle and the heated, outer peripheral surface 50 of electrode 28 to ionize the gas and form the plasma gas which has a cooling effect on electrode 28 as well as on the nozzle. Moreover, the flow of gas within the interior cooling passage or chamber 34 of the electrode serves to cool the electrode from the inside as the combined gas and vapor flow through orifice means 40 to passage 46 in the nozzle.

The present invention is particularly directed to supplying water to the bottom end 38 of the closed chamber 34 in the electrode. This end is adjacent tip end 32 which is the hottest part of the electrode. The temperature of the inner peripheral walls of passage 34 exceed the boiling point temperature of the liquid W, typically water, metered from the downstream end of small diameter injector tube 56. The water is delivered by the displacement pump 66 to tube 56 so as to be ejected from the outlet end 60 of the coolant tube 56 at a controlled rate to prevent flooding of chamber 34 and to allow immediate conversion into steam S. Preferably, the water is ejected one drop at a time, however, because of the pressurized gas flow into chamber 34, turbulent conditions exist and, in practice, the water may not exit in the form of separate drops.

As illustrated in FIG. 2, the ejected water W may be collected in the bottom end 38 of chamber 34 in a pool P. Since the end of the electrode is typically at a temperature $T_E$ of between about 400° C. and 800° C. during operation of the torch, the water W normally boils immediately upon contacting the electrode. By using the invention, the surfaces at end 38 are in the range between 100° and 300° C. Water W converts to a vapor. If the rate is sufficient, pool P may develop momentarily as the water is boiled into water vapor or steam S. This conversion of the water from the liquid state to the vapor state uses significantly more heat energy than that required to heat the water as in conventional recirculating cooling systems. This is because the heat of vaporization is much higher than the heat required to raise water temperature. In a normal water cooled torch, water is flowed through the electrode at a flow temperature $T_1$. The electrode is at a substantially higher temperature $T_2$. The coolant is flowed at a high rate so that $T_1$ is increased only a few degrees. This heat transfer is primarily by conduction in conjunction with convection and demands high flow rates of the coolant to control the temperature of the electrode tip. By the invention, conversion of the small volume of liquid water to steam in chamber 34 causes a high transfer of heat from conduction through the electrode and drawing the heat away by evaporation to thereby provide effective cooling of the electrode so as to give the same cooling as water flow with drastically less water.

The steam S then mixes with the compressed air supplied to chamber 34 and flows through orifice means 40 where it combines with the air flow forming the plasma in chamber 46 around the electrode if air is directed to this area without going through passage 34. Since the plasma gas is so hot, the steam remains in the vapor state and does not affect the operational performance of the torch vis-a-vis the workpiece.

Figure 3:
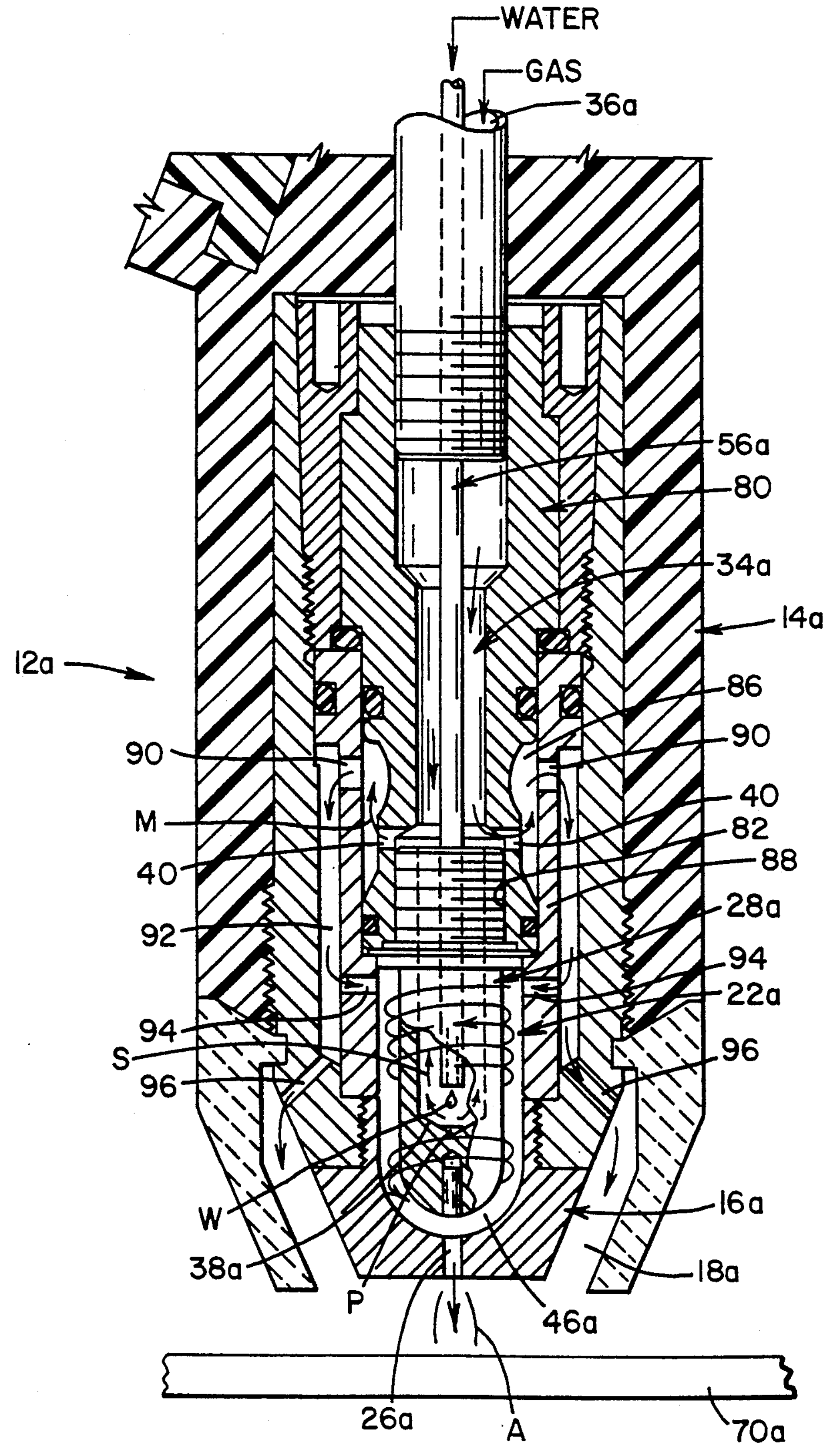
FIG. 3 is a cross-sectional view through a preferred embodiment of a plasma torch in accordance with the present invention.

A preferred embodiment of the invention is illustrated in FIG. 3 wherein the plasma torch 12*a* includes a torch housing 14*a* having a chamber 18*a* containing a hollow core or chamber 22*a* of the nozzle and an electrode 28*a*. The electrode includes an electrode support member 80 being threaded at one end 82. An electrode element 28*a* is threadedly connected to the electrode support member. An orifice 40 is provided in the wall of the electrode support member. A coolant tube 56*a* is disposed in the electrode 28*a*.

In operation of the embodiment illustrated in FIG. 3, compressed air is supplied to the inlet 36*a* of the chamber 34*a* of the electrode. The air flows towards the bottom end 38*a* and mixes with steam S formed from the water supplied through coolant tube 56*a*. The aggregate flow M of mixed compressed air and steam S then pass through one or more orifices 40 into chamber 86 defined by the outer surface of electrode support 80 and a cylindrical flow divider 88. The mixed gas flow next passes through a plurality of circumferentially spaced orifices 90 into chamber 92 defined by the outer cylindrical surface of the flow divider 88 and the nozzle 16*a*. The flow divider separates the mixture of gas and steam into a primary flow through circumferentially spaced orifices 94 and into chamber 46*a* for generating plasma A which is emitted through exit orifice 26*a* towards workpiece 70*a*. The orifices 94 are preferably disposed so as to cause the gas to swirl about the electrode in accordance with known practice. The plasma gas further cools the electrode and the nozzle as it contacts the inner peripheral walls of these torch components during the flow through chamber 46*a*. The remainder of the gas and steam mixture in chamber 92 flows through orifices 96 into chamber 18*a* to cool the torch body and the nozzle. In general, the gas and steam mixture, as compared with air alone, provides for more effective cooling of the overall torch and the specific torch components with which it comes into contact because of the higher cooling capacity of the vapor than that of air.

Referring again to FIG. 2, water W is introduced in a small controlled amount to cooling passage 34 by small diameter metering tube 56. The rate of water introduction must be such to prevent flooding of chamber 34 so that vaporization or boiling can occur nearly instantaneous by the heated inner surface of electrode 28 having a temperature of 400° C. -800° C. before being cooled and 100° to 300° C. when cooled by the present invention. As a drop of water contacts the surface, it is evaporated. The rate of heat energy supplied by the electrode furnishes the heat of vaporization t the water. This transfers heat by conduction through the electrode so that it can be drawn away to vaporize the water. Chamber or cooling passage 34 has a sufficient volume to allow for the steam creation. Heat transfer by conduction and convection in normal water cooled plasma torches use heat conduction through the electrode, which is a slow transfer and convection of heat which is dependent on the ratio of absolute temperature between the water contacting the electrode surface and the temperature of the surface contacted. Convection efficiency is increased by decreasing the temperature of the cooling water and/or increasing the flow rate. This requires a large amount of water. The disadvantage of the normal water cooled system is overcome by the present invention. In a normal water cooling system, if the water supply is interrupted, the plasma torch overheats and must be removed from service. The present invention is more versatile. If too much water is supplied, it first starts to fill the electrode by increasing pool P and then floods the electrode. This will not harm the torch. If the water supply is interrupted, cooling by gas continues without rapid overheating of the torch.

Figure 4:
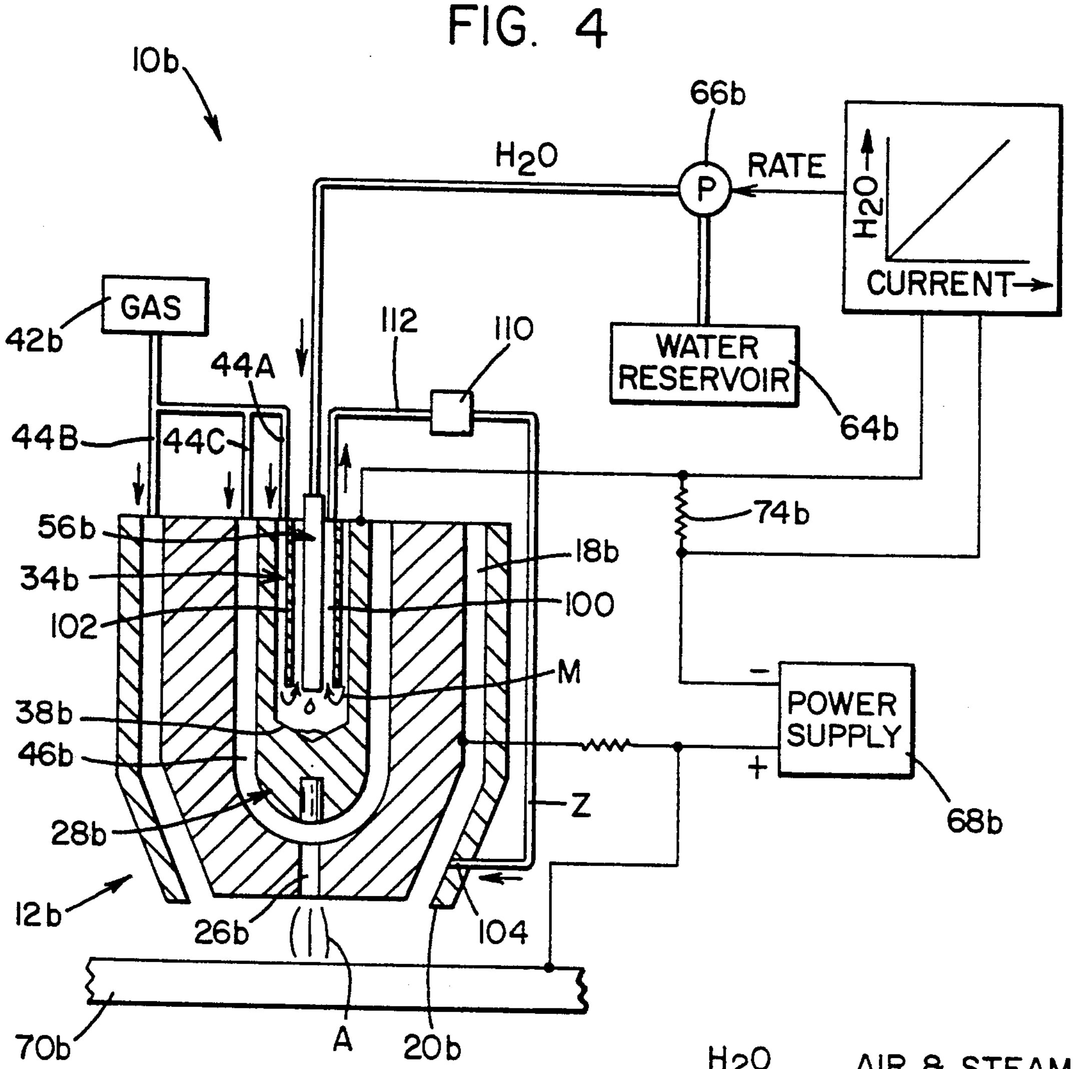
FIG. 4 is a schematic of a plasma torch system wherein a coolant in the gaseous state is combined with a gas within an axial chamber in the electrode and then combined with the secondary gas adjacent the outlet end of the torch.
Figure 4A:
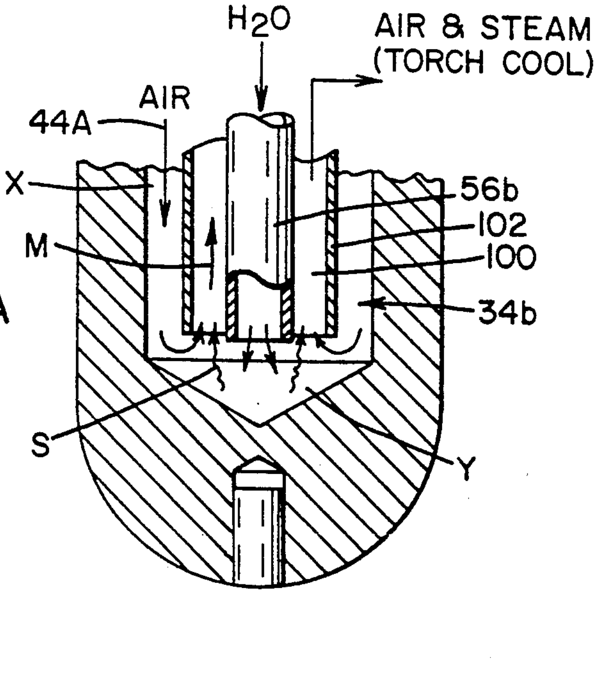
FIG. 4A is an enlarged cross-sectional schematic view showing the concept of the torch illustrated in FIG. 4.

In accordance with an aspect of the invention, tube 56 has an internal diameter of less than about 0.100 in a 60 ampere plasma torch. For example, the diameter is about 1/16 inch and the bottom end is disposed less than about 0.500 inches from the bottom of cooling chamber 34. The water rate is less than 2000 ml/hr. In the 60 ampere torch, the water rate is 500 ml/hr through the internal 1/16 inch passage of tube 56. When system 55 is employed, the water rate can be automatically adjusted by the sensed operating current. The controlled water rate is about 100 ml/hr for each 8 to 15 amperes. In the example of a 60 ampere torch, the rate would be 60 divided by 8 to 15 times 100 ml/hr. This gives a flow rate of 750 ml/hr to 400 ml/hr. These rates have proven operative; however, other rates can be used to vaporize the injected water instead of flooding the electrode cooling chamber. Referring to FIGS. 4 and 4A, there is illustrated a second embodiment of the present invention which is primarily distinguished from the first embodiment in that the vapor generated in chamber **34*b* by injection of liquid from tube 56*b* is combined with air from conduit 44A and passes through annulus passage 100 formed by sleeve 102 concentric with tube 56*b*. The air and liquid vapor is mixed with the shield gas flowing through chamber 18*b* at inlet 104. This version of the invention has the advantage that excess cooling air is drawn over the inner surface of the electrode and then mixed with steam S or vapor after which it is immediately exhausted. Even if the liquid were stopped, the torch operates cooler because there is more cooling air flowing through the torch. Flow restrictor 110 is used to achieve a workable balance of plasma gas and shielding gas. The pressure at point X is higher than the pressure at point Y to cause flow in the proper direction. Further, the pressure at inlet 104** (Z) is less than the pressure at point Y. This embodiment reduces the contact of the heated vapor with the inner peripheral surface of the nozzle and the outer peripheral surface of the electrode which prevents heat transfer from the vapor and gas combination to the torch components and thereby reduces their operating temperature. Further, since impurities from the coolant are substantially prevented from flowing through the torch, corrosion and blockage of passageways are substantially eliminated. Another advantage of this embodiment is that the vapor is not mixed with the plasma gas. In the event that the vapor also includes some liquid, it does not interfere with the formation of the plasma and its interaction with the electrode to provide the arc.

Referring specifically to the illustration of system **10*b* in FIG. 4, sleeve 102 is disposed concentrically about the feed tube 56*b* to receive high pressure, compressed mixing gas from supply 42*b* through conduit 44A for mixing with vapor in chamber 34*b*. The mixture M of vapor and compressed gas is then directed through conduit 112 and regulator 110 into an inlet 104 where it is mixed with the secondary or shield gas near the outlet end 20*b* of torch 12*b* and directed through chamber 18*b*** for cooling the torch.

Figure 5:
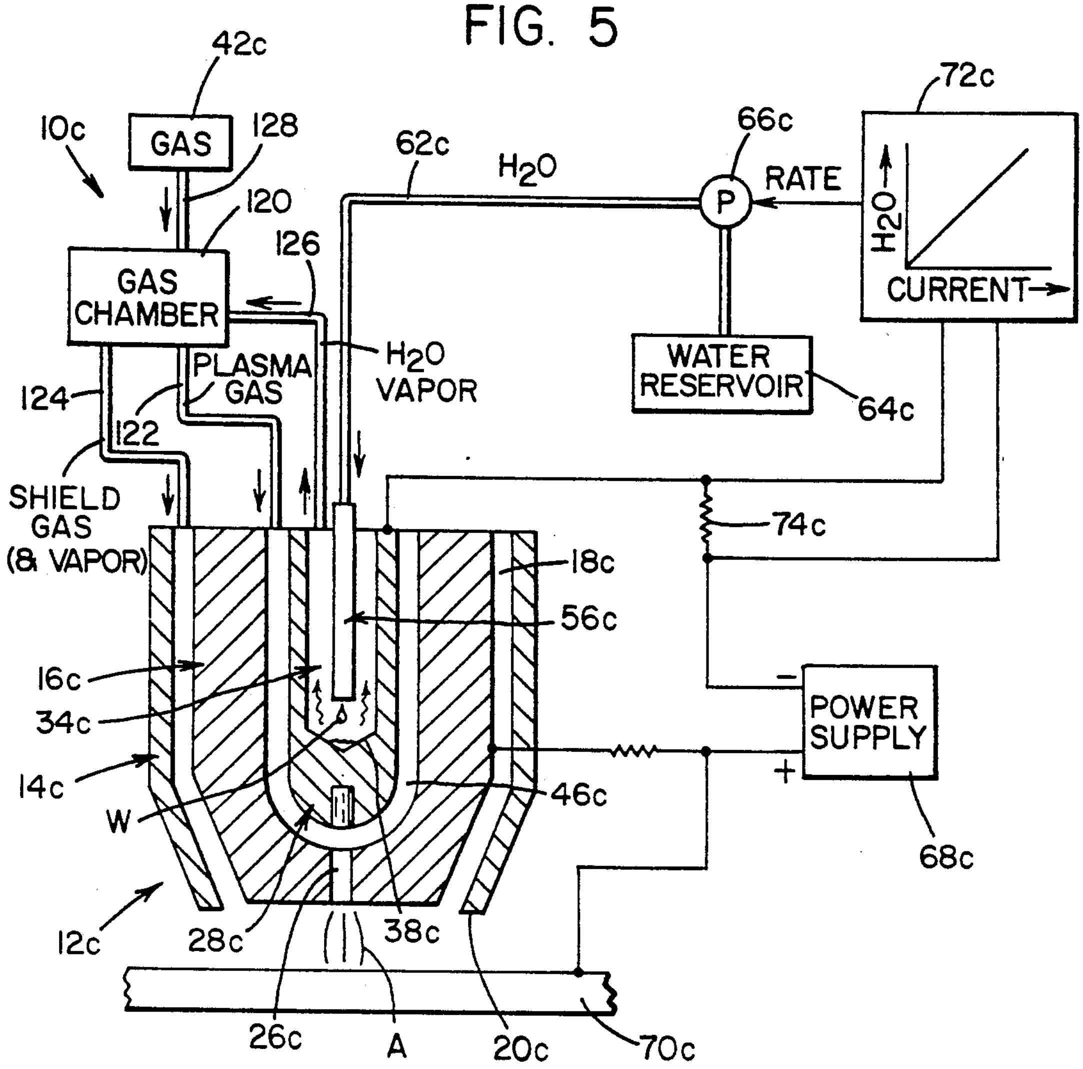
FIG. 5 is a schematic of a plasma torch system wherein liquid coolant, subsequent to being converted to the gaseous state, is combined with gas, the aggregate of which is then separated into primary gas flow for the plasma and secondary gas flow to form a shield flow.

Referring to FIG. 5, there is illustrated a third embodiment of the present invention which is primarily distinguished from the first and second embodiments illustrated in FIGS. 1, 3 and 4 in that the vapor formed in chamber **34*c* of electrode 28*c* is directed to and mixed in a gas chamber 120 prior to the gas being separated into the primary and secondary gas flows through chambers 46*c* and 18*c*, respectively, by way of conduits 122 and 124. Steam is directed to chamber 120 by way of line 126 from passage 34*c***.

Specifically, a liquid coolant, such as water, is introduced through tube **56*c* into chamber 34*c* at a selected rate to prevent flooding of the chamber so that vaporization or boiling can occur nearly instantaneous by the heated inner peripheral surface of chamber 34*c* in electrode 28*c*. The conversion of the coolant from the liquid state to the vapor state provides for a rapid heat transfer by conduction through the electrode and then heat being drawn off to vaporize the coolant. Pressurized gas is not directed into chamber 34*c*, as in the embodiment shown in FIG. 4. Thus, the cooling is exclusively by the liquid coolant. If the liquid is stopped, the torch functions as a standard air cooled torch. Efficient injection of small, regulated amounts of coolant into the system 10*c* is used as the cooling. Since the vapor or steam in chamber 34*c* is not mixed with the pressurized gas in chamber 34*c*, impurities contained in the coolant primarily remain in chamber 34*c*** and do not circulate through the torch. Thus, when the electrode is replaced, which occurs on a relatively frequent basis, i.e. approximately each 4.0 arc hours, the collected impurities are discarded and the opportunities for corrosion and/or clogging are reduced.

The vapor formed in chamber **34*c* flows through schematically illustrated conduit means 126 into the gas chamber 120. The gas chamber receives gas through schematically illustrated conduit means 128 from gas supply 42*c*. The gas is then separated into the primary flow through schematically illustrated conduit means 122 to chamber 46*c* and secondary flow through schematically illustrated conduit means 124 to chamber 18*c* to provide a shield or cooling gas flow which specifically cools the nozzle 16*c* and the torch housing 14*c***. An advantage of this arrangement is that the vapor and compressed air mixture are forced through the torch before the vapor condenses back into the liquid state. Further, the gas and vapor mixture through contact primarily with the nozzle and torch housing effect a cooling of the structural components of the torch.

Figure 6:
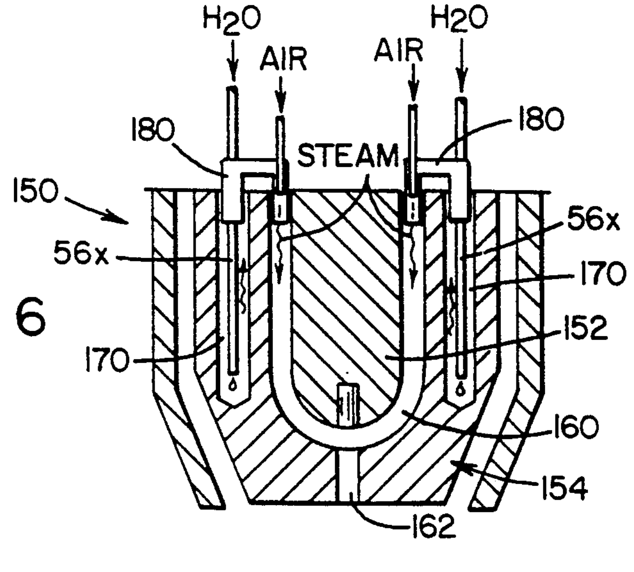
FIG. 6 is a partial, enlarged cross-sectional view of the end portion of a torch showing an alternative location for the liquid cooling passage.

Referring now to FIG. 6, the torch 150 has a solid electrode 152 with a nozzle 154 forming primary passage 160 for directing a plasma from outlet 162. The cooling system for torch 150 includes a number of circumferentially spaced cooling passages 170, two of which are shown. Liquid injector tubes **56*x* are used to inject small, controlled amounts of liquid, i.e. water, into the cooling passages at a lower position adjacent outlet 162. The vaporized water cools nozzle 154. The vapor passes through conduit means 180 into passage 160**. The passage is also supplied by cooling gas. This embodiment is shown to illustrate use of the invention to cool various components of a plasma torch.

Figure 7:
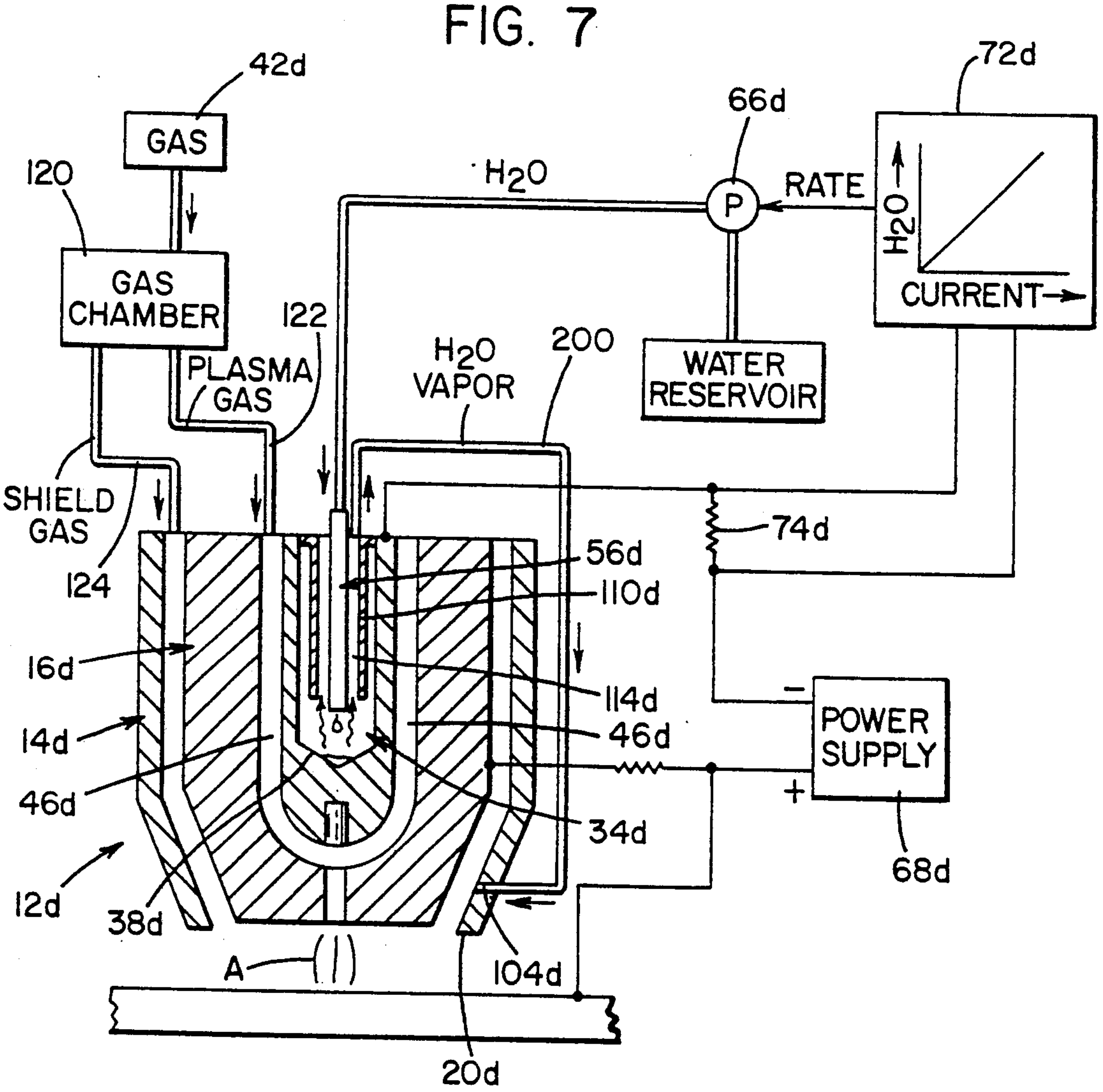
FIG. 7 is a schematic of a plasma torch system wherein a liquid coolant, subsequent to being converted to the gaseous state, is combined with the secondary gas flow adjacent the outlet of the torch to reduce heating of the torch.

Referring to FIG. 7, there is schematically illustrated another embodiment of the present invention which is similar to the embodiment of FIGS. 4 and 5 except the vapor generated in the chamber **34*d* flows directly through a conduit 200 to inlet 104*d* to be mixed with the secondary or shield gas near the outlet end 20*d* of torch 12*d*. This is advantageous because the vapor formed in chamber 34*d* is not being severely stirred and, therefore, only coolant in the vapor state is likely to be directed out of the electrode. The impurities within the liquid coolant are forced through conduit 200**. Another advantage of this embodiment is that separate gases can be used for the primary plasma generating gas and the secondary or shield gas. Finally, as discussed before, the mixing of the heated vapor with the shield gas near the outlet of the torch primarily reduces the operating temperature of the torch housing and the nozzle which increases their operating life and enables the use of certain useful materials having a relatively lower melting temperature for their construction.

Referring again to FIG. 7, an exhaust tube **110*d* is concentrically disposed about coolant tube 56*d*. Vapor formed from liquid coolant delivered through tube 56*d*** to chamber 34*d* passes through the annular chamber 114*d* formed between tubes 110*d* and 56*d*. The vapor generated through contact of the liquid coolant with the interior surface of the electrode then flows through conduit 200 and inlet 104*d* to mix with the flow of secondary gas from the outlet end 20*d* of the torch 12*d*. Although the gas chamber 120 is illustrated as directing the same gas from gas source 42*d* into conduits 122 and 124, it is within the terms of the invention to use different gases and gas mixtures for the primary plasma forming gas and for the secondary or shield gas in this embodiment as well as the others discussed in this specification.

Figure 8:
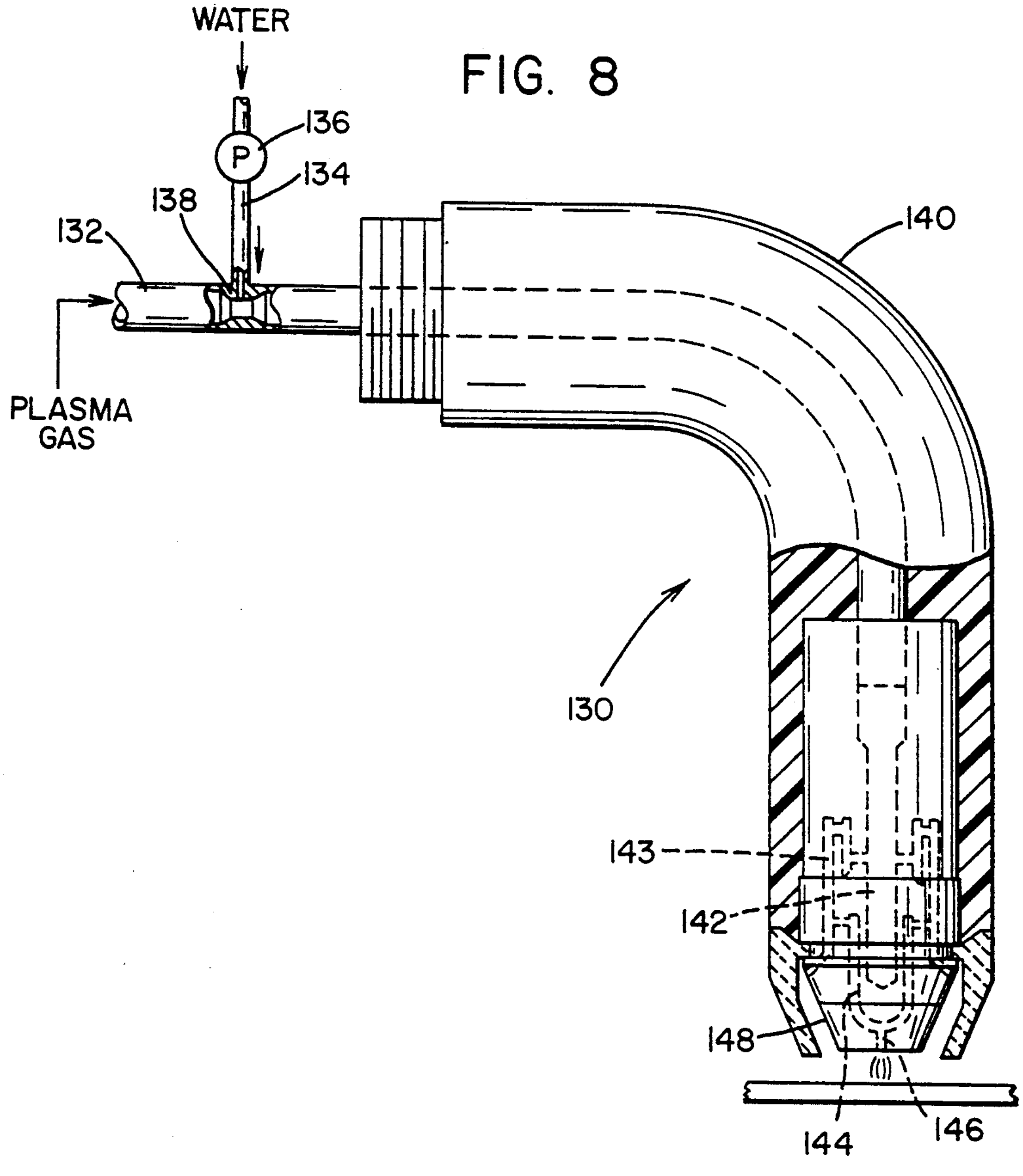
FIG. 8 is a schematic of a plasma torch system wherein a liquid coolant in the atomized state is mixed with a plasma gas within a plasma torch.

FIG. 8 is directed to a related invention where the liquid coolant is atomized and directed into the primary incoming gas flow. A plasma torch 130 of the type generally discussed hereinbefore is schematically illustrated. Flow passageways for the primary and secondary gas are illustrated with dashed lines. Although a specific arrangement is illustrated, any passageway configuration incorporating the atomized liquid coolant is within the scope of this object of the invention. Suitable plasma creating gas, such as compressed air, is directed into the inlet of conduit 132. Liquid coolant is also directed through conduit 134 into the inlet conduit 132. Preferably, the coolant flow is controlled by a pump 136, similar to pump 66 discussed before, which can control the delivery of liquid coolant in response to factors such as the current flow to the electrode as discussed hereinbefore.

The atomization of the liquid coolant subdivides the incoming liquid and exposes a large surface of the liquid to heated surfaces of the torch for increased heat transfer. Atomization of the incoming liquid coolant can be accomplished by any conventional apparatus, such as, for example, providing a flow restrictor 138 within the conduit 132. The restrictor causes an increase in the gas velocity and a decrease in the pressure within the restrictor. The liquid coolant is injected into the low pressure region of the restrictor 138 and atomized into very fine drops. The mixture of atomized liquid coolant and gas then flow into the body 140 of the torch. In a torch configured similar to that illustrated in FIG. 3, the gas and atomized coolant mixture can flow into the interior chamber 142 of an electrode. The intense heat generated by the operation of the torch causes the atomized liquid coolant to boil and then be vaporized from contact with the heated inner peripheral walls of the electrode. The increased surface area of the atomized liquid coolant increases the physical contact between the liquid and the walls of the electrode. This causes a high degree of cooling based on the principles of heat transfer of conduction through the electrode and extracting heat when vaporizing the liquid coolant. The gas and coolant mixture, with the coolant partially vaporized and partially atomized, then flows out of the electrode into passageway 143 and separates into the primary plasma flow and the secondary shield flow. The primary flow across the external peripheral surface 144 of the electrode provides additional cooling of the electrode as well as the nozzle prior to being emitted through outlet 146. The secondary flow across the external peripheral surface 148 of the nozzle cools the nozzle as well as the external housing of the torch.

In controlling the atomization of the liquid coolant, it is preferable to produce very fine drops, i.e. less than 10 micrometers in diameter. To control the cooling process, the flow restrictor is selected to provide a desired velocity and pressure of the gas flowing therethrough and the injection pressure of the coolant is controlled to produce drops having the desired size. Further, it is desirable that the process be regulated so that the coolant is completely vaporized prior to flowing across the external peripheral surface of the electrode in order that the generation of the plasma arc is not adversely affected. The heated surfaces and high velocity of the gases forced through a torch have a tendency to atomize and then vaporize water injected into the incoming gases; therefore, this alternative concept of using liquid coolant which ultimately vaporizes can be used by injecting liquid coolant into the pressurized gas streams.

The invention has been described with relevance to preferred embodiments and it is apparent that many modifications can be incorporated into the designs and configurations of the plasma arc torches disclosed herein without departing from the sphere or essence of the invention. It is intended to include all such modifications and alterations insofar as they come within the scope of the present invention. Further features of the various embodiments can be combined as desired.

Wherefore, it is claimed:

1. A plasma torch comprising a housing defining gas flowing chamber means having an inlet and an outlet at opposite ends for directing gas through said housing; means for supplying a gas to the chamber flowing towards said outlet, said gas suitable for generating a plasma; an elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; means for directing a controlled amount of liquid coolant into said inlet of said means for cooling at a flow rate allowing conversion of a substantial portion of said coolant into vapor and said cooling means including means to vaporize said coolant for cooling said electrode by the heat of vaporization of said liquid coolant.

2. A plasma torch as defined in claim 1 wherein said means for cooling comprises an axial cooling chamber extending into said electrode from said first end thereof to a closed bottom end adjacent said outlet of said gas flowing chamber and said means for directing a controlled amount of liquid coolant comprises tube means extending into said axial cooling chamber.

3. A plasma torch as defined in claim 2 wherein said tube means includes a coolant tube having a central liquid passageway with an outlet at one end and means for mounting said tube in said axial cooling chamber of said electrode with said tube outlet adjacent said closed bottom of said cooling chamber.

4. A plasma torch as defined in claim 3 wherein said central liquid passageway is circular and has an internal diameter of less than about 0.100 inches.

5. A plasma torch as defined in claim 4 wherein said central liquid passageway has an internal diameter of about 1/16 inches.

6. A plasma torch as defined in claim 3 wherein said central liquid passageway has an internal diameter of about 1/16 inches.

7. A plasma torch as defined in claim 6 includes a liquid coolant supply and means for supplying said controlled amount of liquid coolant from said supply to said passageway of said coolant tube.

8. A plasma torch as defined in claim 3 includes a liquid coolant supply and means for supplying said controlled amount of liquid coolant from said supply to said passageway of said coolant tube.

9. A plasma torch as defined in claim 8 wherein the means for supplying said controlled amount of liquid includes pump housing means for controlling the amount of liquid coolant delivered to said passageway of said coolant tube.

10. A plasma torch as defined in claim 7 wherein the means for supplying said controlled amount of liquid includes pump housing means for controlling the amount of liquid coolant delivered to said passageway of said coolant tube.

11. A plasma torch a defined in claim 10 wherein said amount of liquid coolant is less than 2000 ml/hr.

12. A plasma torch as defined in claim 11 wherein said amount of liquid coolant is dependent on said amperage applied to said electrode.

13. A plasma torch as defined in claim 1 wherein said cooling chamber means comprises at least one cooling passage having an inlet adjacent said first end of said electrode, said cooling passage having a closed bottom end at a position adjacent said outlet of said gas flowing chamber and said means for directing a controlled amount of liquid coolant comprises tube means extending into said cooling passage.

14. A plasma torch as defined in claim 10 wherein said pump is a positive displacement pump.

15. A plasma torch as defined in claim 9 wherein said pump is a positive displacement pump.

16. A plasma torch as defined in claim 2 wherein said flow rate of liquid coolant is sufficiently low to cause individual drops of coolant liquid to be delivered to the closed bottom end of said electrode.

17. A plasma torch as defined in claim 1 wherein said liquid coolant is water.

18. A plasma torch as defined in claim 2 wherein said liquid coolant is water.

19. A plasma torch comprising a housing defining gas flowing chamber means having an inlet and an outlet at opposite ends for directing gas through said housing; means for supplying a gas to the chamber flowing towards said outlet, said gas suitable for generating a plasma; an elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; and means for directing a controlled amount of liquid coolant into said inlet of said means for cooling at a flow rate allowing conversion of a substantial portion of said coolant into vapor to cool said electrode by the heat of vaporization of said liquid coolant, said means for cooling comprising an axial cooling, said means for cooling comprising an axial cooling chamber extending into said electrode from said first end thereof to a closed bottom end adjacent said outlet of said gas flowing chamber, said means for directing a controlled amount of liquid coolant comprising tube means extending into said axial cooling chamber, said tube means includes a coolant tube having a central liquid passageway with an outlet at one end and means for mounting said tube in said axial cooling chamber of said electrode with said tube outlet adjacent said closed bottom of said cooling chamber, said central liquid passageway having an internal diameter of about 1/16 inches, said torch including a liquid coolant supply and means for supplying said controlled amount of liquid coolant from said supply to said passageway of said coolant tube, said means for supplying said controlled amount of liquid including pump housing means for controlling the amount of liquid coolant delivered to said passageway of said coolant tube, said amount of liquid coolant being less than 2000 ml/hr., said amount of liquid coolant being dependent on said amperage applied to said electrode, and said amount of liquid coolant being supplied at a rate of 100 ml/hr for each 8-15 amperes supplied to said electrode.

20. A plasma torch comprising a housing defining gas flowing chamber means having an inlet and an outlet at opposite ends for directing gas through said housing; means for supplying a gas to the chamber flowing towards said outlet, said gas suitable for generating a plasma; an elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; and means for directing a controlled amount of liquid coolant into said inlet of said means for cooling at a flow rate allowing conversion of a substantial portion of said coolant into vapor to cool said electrode by the heat of vaporization of said liquid coolant, said means for cooling comprising an axial cooling chamber extending into said electrode form said first end thereof to a closed bottom end adjacent said outlet of said gas flowing chamber, said means for directing a controlled amount of liquid coolant comprising tube means extending into said axial cooling chamber, said tube means including a coolant tube having a central liquid passageway with an outlet at one end and means for mounting said tube in said axial cooling chamber of said electrode with said tube outlet adjacent said closed bottom of said cooling chamber, said central liquid passageway having an internal diameter of about 1/16 inches, said torch including a liquid coolant supply and means for supplying said controlled amount of liquid coolant from said supply to said passageway of said coolant tube, said means for supplying said controlled amount of liquid including pump housing means for controlling the amount of liquid coolant delivered to said passageway of said coolant tube, said amount of liquid coolant being less than 2000 ml/hr., and said amount of liquid coolant being supplied at a rate of 100 ml/hr for each 8-15 amperes supplied to said electrode.

21. A plasma torch comprising a housing defining gas flowing chamber means having an inlet and an outlet at opposite ends for directing gas through said housing; means for supplying a gas to the chamber flowing towards said outlet, said gas suitable for generating a plasma; an elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; and means for directing a controlled amount of liquid coolant into said inlet of said means for cooling at a flow rate allowing conversion of a substantial portion of said coolant into vapor to cool said electrode by the heat of vaporization of said liquid coolant, said means for cooling comprising an axial cooling chamber extending into said electrode from said first end thereof to a closed bottom end adjacent said outlet of said gas flowing chamber, said means for directing a controlled amount of liquid coolant comprising tube means extending into said axial cooling chamber, said tube means including a coolant tube having a central liquid passageway with an outlet at one end and means for mounting said tube in said axial cooling chamber of said electrode with said tube outlet adjacent said closed bottom of said cooling chamber, said torch including a liquid coolant supply and means for supplying said controlled amount of liquid coolant from said supply to said passageway of said coolant tube, said means for supplying said controlled amount of liquid including pump housing means for controlling the amount of liquid coolant delivered to said passageway of said coolant tube, and said amount of liquid coolant being supplied at a rate of 100 ml/hr for each 8-15 amperes supplied to said electrode.

22. A plasma torch comprising a housing defining gas flowing chamber means having an inlet and an outlet at opposite ends for directing gas through said housing; means for supplying a gas to the chamber flowing towards said outlet, said gas suitable for generating a plasma; an elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; and means for directing a controlled amount of liquid coolant into said inlet of said means for cooling at a flow rate allowing conversion of a substantial portion of said coolant into vapor to cool said electrode by the heat of vaporization of said liquid coolant, said means for cooling comprising an axial cooling chamber extending into said electrode from said first end thereof to a closed bottom end adjacent said outlet of said gas flowing chamber, said means for directing a controlled amount of liquid coolant comprising tube means extending into said axial cooling chamber, said tube means including a coolant tube having a central liquid passageway with an outlet at one end and means for mounting said tube in said axial cooling chamber of said electrode with said tube outlet adjacent said closed bottom of said cooling chamber, said central liquid passageway having an internal diameter of about 1/16 inches, said torch including a liquid coolant supply and means for supplying said controlled amount of liquid coolant from said supply to said passageway of said coolant tube, and said amount of liquid coolant being supplied at a rate of 100 ml/hr for each 8-15 amperes supplied to said electrode.

23. A plasma torch comprising a housing defining gas flowing chamber means having an inlet and an outlet at opposite ends for directing gas through said housing; means for supplying a gas to the chamber flowing towards said outlet, said gas suitable for generating a plasma; an elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; and means for directing a controlled amount of liquid coolant into said inlet of said means for cooling at a flow rate allowing conversion of a substantial portion of said coolant into vapor to cool said electrode by the heat of vaporization of said liquid coolant, said means for cooling comprising an axial cooling chamber extending into said electrode from said first end thereof to a closed bottom end adjacent said outlet of said gas flowing chamber, said means for directing a controlled amount of liquid coolant comprising tube means extending into said axial cooling chamber, said tube means including a coolant tube having a central liquid passageway with an outlet at one end and means for mounting said tube in said axial cooling chamber of said electrode with said tube outlet adjacent said closed bottom of said cooling chamber, said central liquid passageway being circular and having an internal diameter of less than about 0.100 inches, and said amount of liquid coolant being supplied at a rate of 100 ml/hr for each 8-15 amperes supplied to said electrode.

24. A plasma torch comprising a housing defining gas flowing chamber means having an inlet and an outlet at opposite ends for directing gas through said housing; means for supplying a gas to the chamber flowing towards said outlet, said gas suitable for generating a plasma; an elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; and means for directing a controlled amount of liquid coolant into said inlet of said means for cooling at a flow rate allowing conversion of a substantial portion of said coolant into vapor to cool said electrode by the heat of vaporization of said liquid coolant said means for cooling comprising an axial cooling chamber extending into said electrode from said first end thereof to a closed bottom end adjacent said outlet of said gas flowing chamber, said means for directing a controlled amount of liquid coolant comprising tube means extending into said axial cooling chamber, said tube means including a coolant tube having a central liquid passageway with an outlet at one end and means for mounting said tube in said axial cooling chamber of said electrode with said tube outlet adjacent said closed bottom of said cooling chamber, and said amount of liquid coolant being supplied at a rate of 100 ml/hr for each 8-15 amperes supplied to said electrode.

25. A plasma torch comprising a housing defining gas flowing chamber means having an inlet and an outlet at opposite ends for directing gas through said housing; means for supplying a gas to the chamber flowing towards said outlet, said gas suitable for generating a plasma; and elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; and means for directing a controlled amount of liquid coolant into said inlet of said means for cooling at a flow rate allowing conversion of a substantial portion of said coolant into vapor to cool said electrode by the heat of vaporization of said liquid coolant, said means for cooling comprising an axial cooling chamber extending into said electrode from said first end thereof to a closed bottom end adjacent said outlet of said gas flowing chamber, said means for directing a controlled amount of liquid coolant comprising tube means extending into said axial cooling chamber, and said amount of liquid coolant being supplied at a rate of 100 ml/hr for each 8–15 amperes supplied to said electrode.

26. A plasma torch comprising a housing defining gas flowing chamber means having an inlet and an outlet at opposite ends for directing gas through said housing; means for supplying a gas to the chamber flowing towards said outlet, said gas suitable for generating a plasma; an elongated electrode having first and second opposite ends disposed in said chamber with said second end disposed near said outlet, whereby a DC voltage at a given amperage applied to said electrode causes a plasma adjacent said outlet resulting in heating of said second end of said electrode; a means for cooling said electrode having an inlet and a closed bottom end, said cooling means being within said torch; and means for directing a controlled amount of liquid coolant into said inlet of said means for cooling at a flow rate allowing conversion of a substantial portion of said coolant into vapor to cool said electrode by the heat of vaporization of said liquid coolant, and said amount of liquid coolant being supplied at a rate of 100 ml/hr for each 8–15 amperes supplied to said electrode.

27. A plasma torch of the type having an electrode with a tip adjacent to and heated by the plasma arc at the outlet of said torch and an internal passage for directing cooling liquid into said electrode adjacent said tip, the improvement comprising means for controlling the rate of flow of said liquid to a rate insufficient to maintain said coolant in a liquid state at said tip and means to vaporize said coolant for cooling said electrode by the heat of vaporization of said liquid coolant.

28. A plasma torch comprising a chamber having an inlet and an outlet at which a plasma arc is created; an elongated electrode having a top end and a tip and extending in said chamber to a position with said tip adjacent said outlet; means for passing a cooling gas through said chamber, around said electrode and out said outlet; a coolant passage adjacent said top of said electrode, means for introducing liquid coolant into said coolant passage at a rate allowing boiling of said coolant into vapor in said coolant passage, and means for boiling said coolant into vapor for cooling said electrode by the heat of vaporization of said liquid coolant.

29. A plasma torch as defined in claim 28 wherein said coolant passage is in said electrode.

30. A plasma torch as defined in claim 28 including means for atomizing said coolant in such chamber.

31. A plasma torch comprising a housing defining a gas flowing chamber having an inlet and an outlet at opposite ends; means for supplying a gas to the chamber flowing towards said outlet, said gas suitable for generating a plasma; an electrode having an outer peripheral surface and first and second opposite ends disposed in said chamber with the second end disposed near said outlet; means for applying a DC voltage at an amperage to said electrode to cause a plasma adjacent said outlet resulting in heating of said electrode; and, means for injecting a controlled amount of liquid coolant in an atomized state into said gas flowing towards said outlet of said gas flowing chamber at a rate allowing conversion of said coolant into a vaporized state, said coolant in an atomized state boiling against the outer surface of said electrode to vaporize and cool said electrode by the heat of evaporation of said coolant in an atomized state.

32. The method of cooling the heated surfaces of the outermost tip portion of an electrode in a plasma torch, said method comprises the steps of:

a) directing a low volume of cooling liquid against said heated surfaces; and, b) controlling said volume to allow said cooling liquid to evaporate into vapor as it contacts said heated surfaces of said electrode.

33. The method of cooling a plasma torch having a gas flowing chamber with an electrode having a heated tip portion disposed therein, said method comprising the steps of:

a) directing a volume of liquid coolant into said gas flowing chamber; and b) controlling said volume of said coolant to allow the liquid coolant to vaporize in said chamber as it contacts said heated tip portion of said electrode.

34. A plasma torch comprising a housing defining gas flowing chamber means having an inlet and an outlet at opposite ends for directing gas through said housing; means for supplying gas to the chamber means flowing toward said outlet; an elongated electrode having first and second opposite ends disposed in said chamber means with the second end being a tip portion located adjacent said outlet; and a means for cooling said tip portion of said electrode, said means for cooling including an elongated cooling passage with an inner end adjacent said tip portion of said electrode and heated thereby, means for directing a controlled amount of liquid coolant into said cooling passage adjacent said inner end at a flow rate allowing conversion of a substantial portion of said liquid coolant into vapor to cool said tip portion of said electrode.

35. A plasma torch comprising a housing defining gas flowing chamber means having an inlet and an outlet at opposite ends for directing gas through said housing; means for supplying gas to the chamber means flowing toward said outlet; and elongated electrode having first and second opposite ends disposed in said chamber means with the second end being a tip portion located adjacent said outlet; and a means for cooling said tip portion of said electrode, said means for cooling including an elongated cooling passage with an inner end adjacent said tip portion of said electrode and heated thereby, means for directing a controlled amount of liquid coolant into said cooling passage adjacent said inner end at a flow rate allowing conversion of a substantial portion of said liquid coolant into vapor, and means to vaporize coolant for cooling said tip portion of said electrode by the heat of vaporization of said liquid coolant.

36. A plasma torch comprising a housing defining gas flowing chamber means having an inlet and an outlet at opposite ends for directing gas through said housing;

means for supplying a gas to the chamber flowing towards said outlet, said gas suitable for generating a plasma;

an electrical power supply;

an elongated electrode having an axial cooling chamber extending into said electrode from said first end thereof to a closed bottom end adjacent said outlet of said gas flowing chamber, said electrode having first and second opposite ends disposed in said chamber with said second end disposed near said outlet;

means for supplying a DC voltage from said power supply to said electrode, whereby said DC voltage at a given amperage applied to said electrode causes a plasma adjacent said outlet resulting in heating of said bottom end of said electrode;

means for directing a controlled amount of liquid coolant against said bottom end of said electrode at a flow rate allowing conversion of a substantial portion of said coolant into vapor to cool the bottom end of said said electrode by the heat of vaporization of said liquid coolant, said means including a coolant tube having a central liquid passageway with an internal diameter of about 1/16 inches, having an outlet at one end and means for mounting said tube in said axial cooling chamber of the electrode with said tube outlet adjacent said closed bottom of said cooling chamber;

a liquid coolant supply; and means for supplying said controlled amount of liquid coolant from said supply to said passageway of said coolant tube, said means including pump housing means for controlling said amount of liquid coolant delivered to said passageway of said coolant tube, including means for adjusting said amount of coolant proportional to the amperes supplied to said electrode by said power supply.

37. A plasma torch comprising a chamber having an inlet and an outlet at which a plasma arc is created;

an elongated electrode with a tip and extending in said chamber to a position with said tip adjacent said outlet;

means for passing a cooling gas through said chamber, around said electrode and out said outlet;

a coolant passage adjacent said top of said electrode;

means for introducing liquid coolant into said coolant passage at a rate allowing boiling of said coolant into vapor in said coolant passage; and means for introducing said vapor into said chamber substantially above said outlet of said chamber whereby said vapor and said cooling gas mix and pass along said electrode and through said outlet.

38. A plasma torch comprising a chamber having an inlet and an outlet at which a plasma arc is created;

an elongated electrode with a tip and extending in said chamber to a position with said tip adjacent said outlet;

means for passing a cooling gas through said chamber, around said electrode and out said outlet;

a coolant passage in said electrode;

means for introducing liquid coolant into said coolant passage at a rate allowing boiling of said coolant into vapor in said coolant passage; and means for introducing said vapor into said chamber substantially above said outlet of said chamber whereby said vapor and said cooling gas mix and pass along said electrode and through said outlet.

39. A plasma torch comprising a housing defining gas flowing chamber means having an inlet and an outlet at opposite ends for directing gas through said housing;

means for supplying gas to said chamber means flowing toward said outlet;

an elongated electrode having first and second opposite ends disposed in said chamber means with said second end being a tip portion located adjacent said outlet;

means for cooling said tip portion of said electrode, said means for cooling including an elongated cooling passage with an inner end adjacent said tip portion of said electrode and heated thereby;

means for directing a controlled amount of liquid coolant into said cooling passage adjacent said inner end at a flow rate allowing conversion of a substantial portion of said liquid coolant into vapor to cool said tip portion of said electrode;

means for forming said cooling passage in said electrode with said inner end adjacent said tip portion; and conduit means for combining said vapor and said gas in said gas flowing chamber means.

40. A plasma torch comprising a housing defining gas flowing chamber means having an inlet and an outlet at opposite ends for directing gas through said housing;

means for supplying gas to said chamber means flowing toward said outlet;

an elongated electrode having first and second opposite ends disposed in said chamber means with said second end being a top portion located adjacent said outlet;

means for cooling said tip portion of said electrode, said means for cooling including an elongated cooling passage with an inner end adjacent said tip portion of said electrode and heated thereby;

means for directing a controlled amount of liquid coolant into said cooling passage adjacent said inner end at a flow rate allowing conversion of a substantial portion of said liquid coolant into vapor to cool said tip portion of said electrode; and conduit means for combining said vapor and said gas in said gas flowing chamber means.

41. A plasma torch comprising a housing defining gas flowing chamber means having an inlet and an outlet at opposite ends for directing gas through said housing;

means for supplying gas to said chamber means flowing toward said outlet;

an elongated electrode having first and second opposite ends disposed in said chamber means with said second end being a tip portion located adjacent said outlet;

means for cooling said tip portion of said electrode, said means for cooling including an elongated cooling passage with an inner end adjacent said tip portion of said electrode and heated thereby;

means for directing a controlled amount of liquid coolant into said cooling passage adjacent said inner end at a flow rate allowing conversion of a substantial portion of said liquid coolant into vapor to cool said tip portion of said electrode; and means for directing cooling gas into said cooling passage whereby said cooling gas combines with said vapor and means for directing said gas and vapor through said outlet.

42. A plasma torch comprising a housing defining gas flowing chamber means having an inlet and an outlet at opposite ends for directing gas through said housing;

means for supplying gas to said chamber means flowing toward said outlet;

an elongated electrode having first and second opposite ends disposed in said chamber means with said second end being a tip portion located adjacent said outlet;

means for cooling said tip portion of said electrode, said means for cooling including an elongated cooling passage with an inner end adjacent said tip portion of said electrode and heated thereby;

means for directing a controlled amount of liquid coolant into said cooling passage adjacent said inner end at a flow rate allowing conversion of a substantial portion of said liquid coolant into vapor to cool said tip portion of said electrode;

means for forming said cooling passage in said electrode with said inner end adjacent said tip portion;

means for directing cooling gas into said cooling passage whereby said cooling gas combines with said vapor and means for directing said gas and vapor through said outlet.

* * * * *